US012671092B2

(12) United States Patent
Nagy et al.

(10) Patent No.: US 12,671,092 B2
(45) Date of Patent: Jun. 30, 2026

(54) COMPOSITE ELECTRODES INCLUDING EMBEDDED POROUS CURRENT COLLECTORS AND METHODS OF MANUFACTURING THE SAME

(71) Applicant: GM GLOBAL TECHNOLOGY OPERATIONS LLC, Detroit, MI (US)

(72) Inventors: Sayed Youssef Sayed Nagy, Troy, MI (US); Meng Jiang, Rochester Hills, MI (US); Thomas E. Moylan, Dearborn Heights, MI (US); Jeffrey David Cain, Royal Oak, MI (US); Caleb Reese, Ferndale, MI (US); Anil K. Sachdev, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 633 days.

(21) Appl. No.: 18/103,129

(22) Filed: Jan. 30, 2023

(65) Prior Publication Data

US 2024/0258526 A1     Aug. 1, 2024

(51) Int. Cl.
*H01M 4/62* (2006.01)
*H01M 4/04* (2006.01)
*H01M 4/66* (2006.01)

(52) U.S. Cl.
CPC ......... *H01M 4/625* (2013.01); *H01M 4/0404* (2013.01); *H01M 4/661* (2013.01)

(58) Field of Classification Search
CPC .. H01M 4/0404; H01M 4/131; H01M 4/1391; H01M 4/1395; H01M 4/625; H01M 4/661; H01M 4/0402; H01M 4/0409
See application file for complete search history.

(56) References Cited

U.S. PATENT DOCUMENTS

2017/0077519 A1* 3/2017 Kubota ................. H01M 4/131
2021/0020898 A1* 1/2021 Lee ..................... H01M 4/0433
2021/0351391 A1* 11/2021 Zhamu ................. H01M 4/667

OTHER PUBLICATIONS

U.S. Appl. No. 17/737,744, filed May 5, 2022, Nagy et al.
U.S. Appl. No. 17/840,928, filed Jun. 15, 2022, Gu et al.
U.S. Appl. No. 17/853,690, filed Jun. 29, 2022, Li et al.
U.S. Appl. No. 17/879,419, filed Aug. 2, 2022, Cain et al.
U.S. Appl. No. 17/880,515, filed Aug. 3, 2022, Nagy et al.

* cited by examiner

*Primary Examiner* — Niki Bakhtiari

(57) ABSTRACT

A composite electrode for an electrochemical cell that cycles lithium ions may include a metal current collector having a three-dimensional porous structure defining an interconnected network of open pores and an electrode material disposed within the open pores of the current collector. An oxygen-containing reactive layer may be formed on surfaces of the current collector and an electrode precursor mixture may be deposited thereon and dried to form a solid electrode material having a continuous structure within the open pores of the current collector. The electroactive material particles and/or the electrically conductive agent may interact with the oxygen-containing reactive layer on the metal current collector to form an oxygen-containing adhesive layer along an interface between the current collector and the solid electrode material. The electroactive material particles and the electrically conductive agent may be chemically bonded to the current collector via hydrogen bonds within the oxygen-containing adhesive layer.

17 Claims, 4 Drawing Sheets

COMPOSITE ELECTRODES INCLUDING EMBEDDED POROUS CURRENT COLLECTORS AND METHODS OF MANUFACTURING THE SAME

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to methods of manufacturing composite electrodes and, more particularly, to methods of manufacturing composite electrodes in which porous current collectors are embedded in composite electrode materials.

Electrochemical cells that cycle lithium ions generally include a negative electrode, a positive electrode, and an electrolyte that provides a medium for the conduction of lithium ions between the negative and positive electrodes during discharge and recharge of the electrochemical cell. During manufacture of the electrochemical cells, the electrodes are oftentimes deposited in the form of thin layers on electrically conductive metal current collectors. The electrodes may be composite materials and may comprise a mixture of electroactive material particles and an electrically conductive agent. The electrically conductive agent provides the composite electrodes with good electrical conductivity and ensures sufficient electrical contact between the electroactive material particles themselves and with the metal current collector. Some composite electrodes may include a binder to help the composite electrodes adhere to the surface of the metal current collectors and to provide cohesion between the electroactive material particles and the electrically conductive agent. It may be desirable, however, to eliminate the binder from composite electrodes, for example, to increase the energy density of the electrochemical cells.

During manufacture of composite electrodes, a slurry of the electroactive material particles, the electrically conductive agent, and optionally a binder dissolved and/or suspended in a polar aprotic solvent may be prepared and cast or deposited on a metal current collector foil using a slot die or transfer-roll coating process. When present, the binder oftentimes comprises polyvinylidene fluoride (PVDF) and n-methyl-2-pyrrolidone (NMP) may be used as the solvent due to its ability to effectively dissolve PVDF. NMP, however, may be considered toxic and may invoke certain regulatory requirements and/or scrutiny.

SUMMARY

A method of manufacturing a composite electrode for an electrochemical cell that cycles lithium ions comprises multiple steps. In step (a), an oxygen-containing reactive layer is formed on wall surfaces of a metal current collector having a first side, an opposite second side, and a three-dimensional porous structure defining an interconnected network of open pores extending between the first side and the second side thereof. In step (b), an electrode precursor mixture is deposited on the wall surfaces of the metal current collector such that the electrode precursor mixture is disposed within the open pores and along the first side and the second side of the metal current collector. The electrode precursor mixture comprises electroactive material particles, an electrically conductive agent, and a solvent. The electrode precursor mixture is substantially free of an organic polymer binder. In step (c), the electrode precursor mixture is dried to remove the solvent therefrom and form a solid electrode material having a continuous structure within the open pores and along the first side and the second side of the metal current collector. At least one of the electroactive material particles and the electrically conductive agent interact with the oxygen-containing reactive layer on the wall surfaces of the metal current collector to form an oxygen-containing adhesive layer along an interface between the wall surfaces of the metal current collector and the solid electrode material. At least one of the electroactive material particles and the electrically conductive agent is chemically bonded to the wall surfaces of the metal current collector via hydrogen bonds within the oxygen-containing adhesive layer.

The oxygen-containing reactive layer may comprise a plurality of -hydroxyl groups, -carboxyl groups, and/or metal oxides covalently bonded to the wall surfaces of the metal current collector.

The oxygen-containing reactive layer may be formed on the wall surfaces of the metal current collector by heating the metal current collector in an oxygen-containing environment.

The oxygen-containing reactive layer may be formed on the wall surfaces of the metal current collector by immersing the metal current collector in an aqueous hydroxide solution.

The oxygen-containing reactive layer may be formed on the wall surfaces of the metal current collector using an electrochemical anodization technique.

The electrically conductive agent may comprise a carbon-based material having oxygen-containing hydrophilic functional groups disposed on a surface thereof. The electroactive material particles and the electrically conductive agent may be chemically bonded to one another within the solid electrode material via hydrogen bonds.

The hydrogen bonds between the electroactive material particles and the electrically conductive agent in the solid electrode material may extend around the three-dimensional porous structure of the metal current collector and through the interconnected network of open pores such that the solid electrode material is retained in physical contact with the metal current collector.

The electrically conductive agent may be chemically bonded to the wall surfaces of the current collector via hydrogen bonds within the oxygen-containing adhesive layer.

The electrode precursor mixture may be deposited on the wall surfaces of the metal current collector using a slot die coating process.

The electrode precursor mixture may be deposited on the wall surfaces of the metal current collector over the first side and the second side of the metal current collector such that the metal current collector is encapsulated in the electrode precursor mixture.

The electrode precursor mixture may be substantially free of polyvinylidene fluoride, ethylene propylene diene monomer rubber, styrene butadiene rubber, carboxymethyl cellulose, and polyacrylic acid. The electrode precursor mixture may be substantially free of N-methylpyrrolidone.

The method may further comprise, prior to step (c), forcing the electrode precursor mixture into the open pores of the metal current collector such that the electrode precursor mixture fills the open pores and removing an excess amount of the electrode precursor mixture from the metal current collector by passing the electrode precursor mixture and the metal current collector between a set of plates disposed on opposite sides of the metal current collector and spaced-apart from one another by a gap.

The method may further comprise, after step (c), consolidating the electroactive material particles and the electrically conductive agent within the solid electrode material by passing the solid electrode material and the metal current collector between set of rollers disposed on opposite sides of the metal current collector and spaced-apart from one another by a gap.

The electroactive material particles may comprise a transition metal oxide that can undergo the reversible insertion or intercalation of lithium ions. In such case, the metal current collector may comprise copper.

The electroactive material particles may comprise silicon, silicon oxide, tin, tin oxide, aluminum, bismuth, antimony, indium, zinc, germanium, germanium oxide, titanium oxide, or a combination thereof. In such case, the metal current collector may comprise aluminum.

A composite electrode for an electrochemical cell that cycles lithium ions comprises a metal current collector, an electrode material, and an oxygen-containing adhesive layer disposed along an interface between the metal current collector and the electrode material. The metal current collector has a first side, an opposite second side, and a three-dimensional porous structure that defines an interconnected network of open pores extending between the first side and the second side thereof. The interconnected network of open pores are defined by walls having wall surfaces that extend between the first side and the second side of the metal current collector. The electrode material has a continuous structure and is disposed within the open pores and along the first side and the second side of the current collector. The electrode material comprises electroactive material particles and an electrically conductive agent. The electrode material is substantially free of an organic polymer binder. The electrode material is chemically bonded to the wall surfaces of the current collector via hydrogen bonds within the oxygen-containing adhesive layer.

The electrically conductive agent may comprise a carbon-based material having oxygen-containing hydrophilic functional groups disposed on a surface thereof. The electroactive material particles and the electrically conductive agent may be chemically bonded to one another within the electrode material via hydrogen bonds. In such case, the hydrogen bonds between the electroactive material particles and the electrically conductive agent in the electrode material may extend around the three-dimensional porous structure of the metal current collector and through the interconnected network of open pores such that the electrode material is retained in physical contact with the metal current collector.

The electrically conductive agent may be chemically bonded to the wall surfaces of the current collector via hydrogen bonds within the oxygen-containing adhesive layer.

The electrode material may have a continuous structure and may extend over the first side and the second side of the current collector such that the current collector is encapsulated in the electrode material.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

The presently disclosed composite electrodes comprise a porous current collector embedded in a continuous electrode material such that the electrode material and the porous current collector are retained in physical contact with one another. The composition and structure of the porous current collector and the electrode material are formulated such that strong chemical bonds (e.g., hydrogen bonds) form between the porous current collector and the electrode material and within the electrode material itself, thereby eliminating the need for an organic polymer binder as well as the need for n-methylpyrrolidone (NMP) to be used as a solvent during deposition of the electrode material on the porous current collector.

Figure 1:
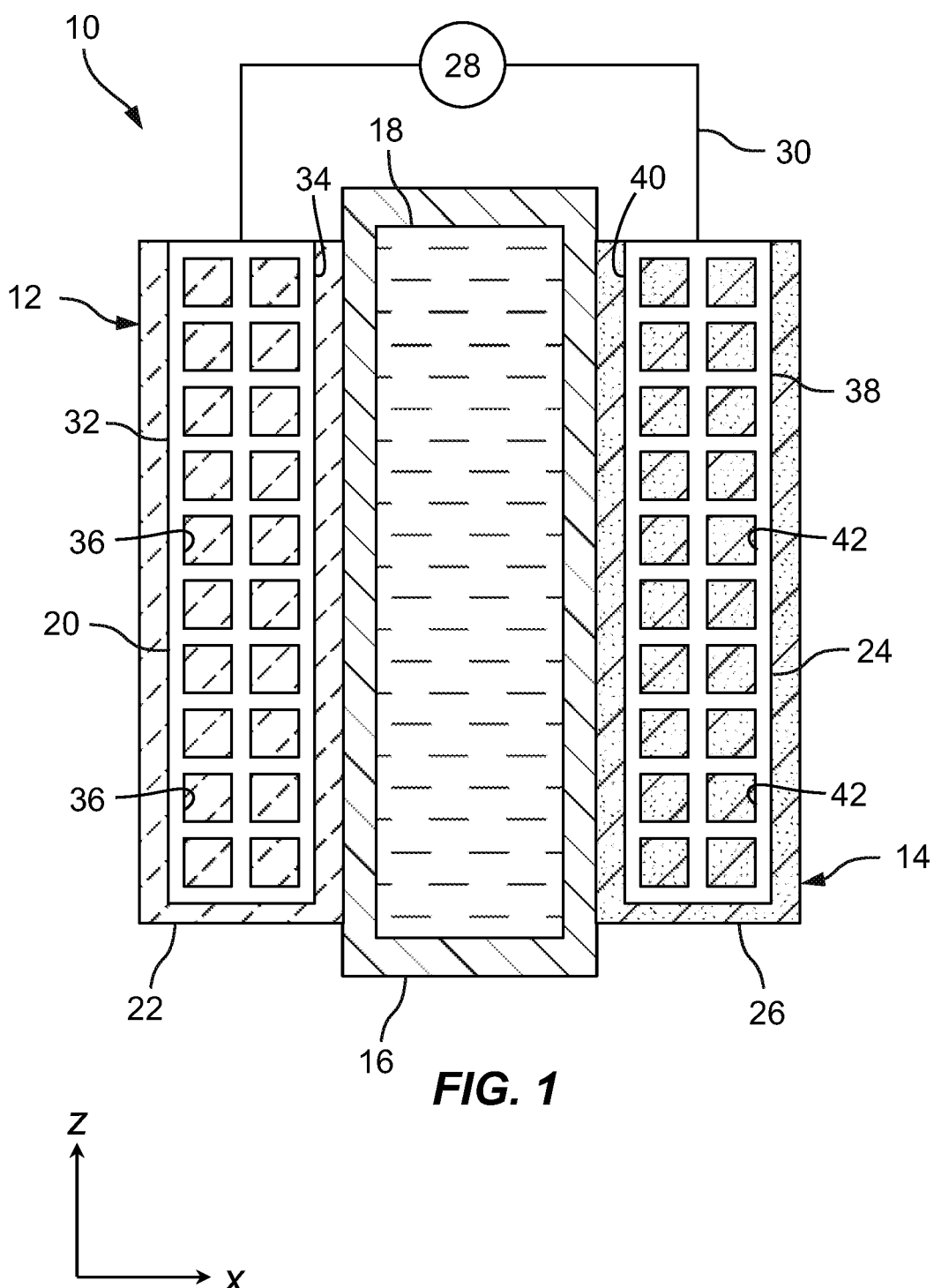
FIG. 1 is a schematic cross-sectional view of an electrochemical cell that cycles lithium ions, the electrochemical cell comprising a positive electrode having a porous three-dimensional current collector embedded therein, a negative electrode having a porous three-dimensional current collector embedded therein, a separator sandwiched between the positive and negative electrodes, and an electrolyte.

FIG. 1 depicts a schematic side cross-sectional view of an electrochemical cell 10 that cycles lithium ions. The electrochemical cell 10 comprises a positive electrode 12, a negative electrode 14, a separator 16, and an electrolyte 18. The positive electrode 12 comprises a positive electrode current collector 20 embedded in a positive electrode material 22. The negative electrode 14 comprises a negative electrode current collector 24 embedded in a negative electrode material 26. In practice, the positive and negative electrode current collectors 20, 24 may be electrically coupled to a power source or load 28 via an external circuit 30. The positive and negative electrode current collectors 20, 24 are electrically conductive and respectively provide an electrical connection between the positive and negative electrode materials 22, 26 and the external circuit 26.

The positive electrode current collector 20 has a first side 32, an opposite second side 34, and a three-dimensional porous structure that defines an interconnected network of open pores 36 extending between the first side 32 and the second side 34 thereof. Like the positive electrode current collector 20, the negative electrode current collector 24 has a first side 38, an opposite second side 40, and a three-dimensional porous structure that defines an interconnected network of open pores 42. As shown in FIG. 1, the positive electrode material 22 is disposed within the open pores 36 and along the first side 32 and the second side 34 of the positive electrode current collector 20, and the negative electrode material 26 is disposed within the open pores 42 and along the first side 38 and the second side 40 of the negative electrode current collector 24. The positive and negative electrode current collectors 20, 24 each may be of unitary one-piece construction or may comprise an assembly of discrete or integral components.

The positive and negative electrode current collectors 20, 24 may be macroporous, with the open pores 36, 42 having pore diameters of greater than 50 nanometers. For example, the positive and negative electrode current collectors 20, 24 each may exhibit a macroporous structure with open pores 36, 42 having pore diameters of greater than or equal to about 2 micrometers to less than or equal to about 1000 micrometers. The three-dimensional porous structure of the positive and negative electrode current collectors 20, 24 may provide the positive and negative electrode current collectors 20, 24 with a porosity or void volume fraction of greater than or equal to about 0.5 to less than or equal to about 0.99.

The three-dimensional porous structure of the positive and negative electrode current collectors 20, 24 may allow for good bonding between the positive and negative electrode materials 22, 26 and their respective positive and negative electrode current collectors 20, 24, without the need for a binder, which might otherwise be used to ensure that physical and electrical contact is maintained between the positive and negative electrode materials 22, 26 and their respective positive and negative electrode current collectors 20, 24 during cycling of the electrochemical cell 10. In FIG. 1, both the positive electrode current collector 20 and the negative electrode current collector 24 are porous. However, in other embodiments, the electrochemical cell 10 may comprise a porous positive electrode current collector 20 and a nonporous negative electrode current collector (not shown). In such case, the negative electrode material 26 may be disposed on a major surface of the nonporous negative electrode current collector in the form of a layer. Alternatively, in some embodiments, the electrochemical cell 10 may comprise a nonporous positive electrode current collector (not shown) and a porous negative electrode current collector 24. In such case, the positive electrode material 22 may be disposed on a major surface of the nonporous positive electrode current collector in the form of a layer.

Figure 2:
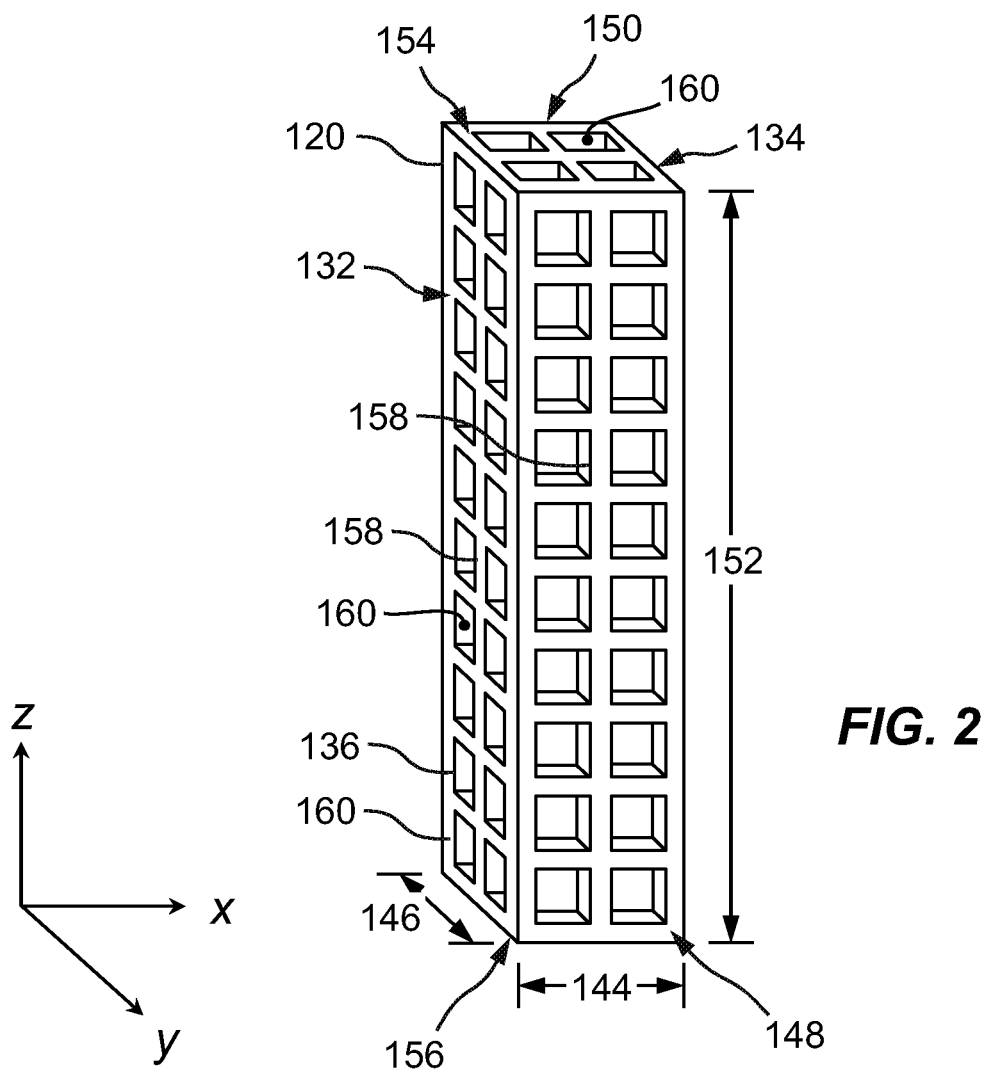
FIG. 2 is a schematic perspective view of current collector having a three-dimensional porous structure that defines an interconnected network of open pores extending between a first side and an opposite second side thereof.

A perspective view of a current collector 120 having a three-dimensional porous structure is depicted in FIG. 2. The current collector 120 is similar in many respects to the positive and negative electrode current collectors 20, 24 depicted in FIG. 1 and like subject matter between the positive and negative electrode current collectors 20, 24 and the current collector 120 may not be repeated here. In aspects, the current collector 120 may be used as the positive electrode current collector 20 and/or as the negative electrode current collector 24 in an electrochemical cell that cycles lithium ions, such as the electrochemical cell 10 depicted in FIG. 1. The current collector 120 has a thickness 144 defined between a first side 132 and an opposite second side 134 thereof, a width 146 defined between a first end 148 and an opposite second end 150 thereof, and a height 152 defined between a top end 154 and an opposite bottom end 156 thereof. In the context of the x-y-z coordinate system depicted in FIG. 2, the thickness 144 of the current collector 120 is measured along the "x" axis, the width 146 of the current collector 120 is measured along the "y" axis, and the height 152 of the current collector 120 is measured along the "z" axis, wherein the x, y, and z axes are perpendicular to one another. The thickness 144 of the current collector 120 may be greater than or equal to about 1 micrometer or about 10 micrometers to less than or equal to about 4 millimeters or about 60 micrometers.

Like the positive and negative electrode current collectors 20, 24, the current collector 120 has a three-dimensional porous structure defining an interconnected network of open pores 136 extending between the first side 132 and the second side 134 thereof. The interconnected network of open pores 136 in the current collector 120 may be defined by walls 158 having wall surfaces 160 that extend at least partway between the first side 132 and the second side 134, between the first end 148 and the second end 150, and/or between the top end 154 and the bottom end 156 of the current collector 120. The morphology of the walls 158 of the current collector 120 may be varied, straight, branched, or dendritic. The morphology of the wall surfaces 160 may be smooth or rough-walled. The wall surfaces 160 of the current collector 120 are not defined by a plurality of discrete particles, such as in a packed-bed.

In aspects, the walls 158 of the current collector 120 may define a three-dimensional stochastic or periodic contiguous lattice support structure or truss including a plurality of repeating unit cells (e.g., a tessellation of one or more geometric shapes). In FIG. 2, the walls 158 of the current collector 120 define a plurality of regularly spaced-apart open pores 136, with each of the pores 136 exhibiting a square cross-sectional shape. In other aspects, the cross-sectional shape of the open pores 136 may be circular, elliptical, or another polygonal shape, e.g., triangular, rectangular, hexagonal, quadrilateral, octagonal, or a combination thereof. In aspects, the porous structure of current collector 120 may be defined by a plurality of woven wires oftentimes referred to as a wire mesh. In some aspects, the porous structure of current collector 120 may be defined by multiple layers of wire meshes stack on top of one another. In aspects, the porous structure of current collector 120 may be reticulated. For example, the porous structure of current collector 120 may be defined by a reticulated open-celled foam.

The current collector 120 may be made of an electrochemically inactive electrically conductive material, e.g., a metal or a metal-based material. Examples of electrochemically inactive electrically conductive materials include copper, copper-based materials, aluminum, aluminum-based materials, nickel, nickel-based materials, iron-based materials (e.g., stainless steel), titanium-based materials, tin-based materials, and combinations thereof. The material of the current collector 120 may depend on whether the current collector 120 is used as the positive electrode current collector 20 or as the negative electrode current collector 24 in an electrochemical cell. In aspects where the current collector 120 is used as the positive electrode current collector 20, the current collector 120 may be made of copper. In aspects where the current collector 120 is used as the negative electrode current collector 24, the current collector 120 may be made of aluminum.

The positive electrode material 22 is configured to store and release lithium ions during discharge and charge of the electrochemical cell 10. The positive electrode material 22 may be in the form of a porous composite material. For example, the positive electrode material 22 may comprise a substantially homogenous mixture of one or more electrochemically active (electroactive) material particles and an electrically conductive agent.

The electroactive material particles of the positive electrode material 22 may comprise a material that can undergo a reversible redox reaction with lithium, e.g., a material that can sufficiently undergo lithium intercalation and deintercalation, alloying and dealloying, or plating and stripping. In one form, the electroactive material particles of the positive electrode material 22 may comprise an intercalation host material that can undergo the reversible insertion or intercalation of lithium ions. In such case, the electroactive material particles of the positive electrode material 22 may comprise a lithium transition metal oxide. For example, the electroactive material particles of the positive electrode material 22 may comprise a layered oxide represented by the formula $LiMeO_2$, an olivine-type oxide represented by the formula $LiMePO_4$, a spinel-type oxide represented by the formula $LiMe_2O_4$, a tavorite represented by one or both of the following formulas $LiMeSO_4F$ or $LiMePO_4F$, or a combination thereof, where Me is a transition metal (e.g., Co, Ni, Mn, Fe, Al, V, or a combination thereof). In some embodiments, the electroactive material particles of the positive electrode material 22 may comprise a lithium transition metal oxide selected from the group consisting of lithium cobalt oxide (LCO), lithium manganese oxide (LMO), lithium nickel manganese cobalt oxide (NMC), lithium nickel cobalt aluminum oxide (NCA), lithium nickel cobalt manganese aluminum oxide (NCMA), and lithium manganese iron phosphate (LMFP). In another form, the electroactive material particles of the positive electrode material 22 may comprise a conversion material including a component that can undergo a reversible electrochemical reaction with lithium, in which the component undergoes a phase change or a change in crystalline structure accompanied by a change in oxidation state. In such case, the electroactive material particles of the positive electrode material 22 may comprise sulfur, selenium, tellurium, iodine, a halide (e.g., a fluoride or chloride), sulfide, selenide, telluride, iodide, phosphide, nitride, oxide, oxysulfide, oxyfluoride, sulfur-fluoride, sulfur-oxyfluoride, or a lithium and/or metal compound thereof. Examples of suitable metals for inclusion in the conversion material of the electroactive material particles of the positive electrode material 22 include iron, manganese, nickel, copper, and cobalt.

The electrically conductive agent is formulated to provide the positive electrode material 22 with good electrical conductivity and to help establish sufficient electrical contact between the electroactive material particles in the positive electrode material 22. The electrically conductive agent may comprise a carbon-based material. For example, the electrically conductive agent may comprise particles of high surface area carbon black, acetylene black, or graphite, carbon fibers (e.g., carbon nanofibers), carbon nanohorns, carbon nanotubes (e.g., single-wall or multiwall carbon nanotubes), onion-like carbon, graphene (e.g., graphene nanoplatelets), graphene oxide, or a combination thereof.

In aspects, the electrically conductive agent may comprise a carbon-based material having oxygen-containing hydrophilic functional groups disposed on a surface thereof.

Examples of oxygen-containing hydrophilic functional groups include -hydroxyl groups (—OH), -carbonyl groups (—C=O), -carboxyl groups (—COOH), -amino groups (—NH$_2$), -sulfhydryl groups (—SH), -phosphate groups (—PO$_4^{-3}$), and/or -sulfonic acid (—SO$_3$H) groups.

The negative electrode material 26 is configured to store and release lithium ions during charge and discharge of the electrochemical cell 10. In some embodiments, the negative electrode material 26 may be in the form of a porous composite material. For example, the negative electrode material 26 may comprise a substantially homogenous mixture of one or more electroactive material particles and an electrically conductive agent. In such case, the electroactive material particles of the negative electrode material 26 may comprise a material that can undergo the reversible insertion or intercalation of lithium ions at a lower electrochemical potential than the electrochemically active material of the positive electrode material 22 such that an electrochemical potential difference exists between the positive and negative electrodes 12, 14. In embodiments, the electroactive material particles of the negative electrode material 26 may comprise particles of a graphite-based material. Additionally or alternatively, the electroactive material particles of the negative electrode material 26 may comprise silicon, silicon oxide (silica), tin, tin oxide, aluminum, bismuth, antimony, indium, zinc, germanium, germanium oxide, titanium oxide, lithiated compounds and/or lithium alloys of the foregoing metals and/or metal oxides (e.g., lithium silicide (LixSi), lithium silicate (LixSiO$_2$), and/or lithium titanate), and combinations thereof. The same materials used as the electrically conductive agent in the positive electrode layer 22 may be used as the electrically conductive agent in the negative electrode material 26 in substantially the same amounts.

The positive electrode material 22 and/or the negative electrode material 26 may be substantially free of a binder. For example, the positive electrode material 22 and/or the negative electrode material 26 may be substantially free of organic polymer binders. Examples of organic polymers that may excluded from the composition of the positive electrode material 22 and/or the negative electrode material 26 include polyvinylidene fluoride (PVDF), ethylene propylene diene monomer (EPDM) rubber, styrene butadiene rubber (SBR), carboxymethyl cellulose (CMC), and/or polyacrylic acid (PAA).

The separator 16 physically and electrically isolates the positive electrode 12 and the negative electrode 14 from each other while permitting lithium ions to pass therethrough. The separator 16 exhibits an open microporous structure and may comprise an organic and/or inorganic material. For example, the separator 16 may comprise a polymer or a combination of polymers. For example, the separator 16 may comprise one or more polyolefins, e.g., polyethylene (PE), polypropylene (PP), polyamide (PA), poly(tetrafluoroethylene) (PTFE), polyvinylidene fluoride (PVdF), and/or poly(vinyl chloride) (PVC). In one form, the separator 16 may comprise a laminate of polymers, e.g., a laminate of PE and PP. In some aspects, the separator 16 may comprise a ceramic coating (not shown) disposed on one or both sides thereof. In such case, the ceramic coating may comprise particles of alumina (Al$_2$O$_3$) and/or silica (SiO$_2$).

The electrolyte 18 is ionically conductive and provides a medium for the conduction of lithium ions between the positive electrode 12 and the negative electrode 14. In assembly, the electrochemical cell 10 may be infiltrated with the electrolyte 18 and the positive electrode material 22 of the positive electrode 12, the porous separator 16, and the negative electrode material 26 of the negative electrode 14 may be in direct physical contact with the electrolyte 18. The electrolyte 18 may be in the form of a nonaqueous liquid electrolyte, a gel electrolyte, or a solid electrolyte. When the electrolyte 18 is in the form of a liquid, the electrolyte 18 may comprise a nonaqueous liquid electrolyte solution comprising a lithium salt dissolved or ionized in a nonaqueous, aprotic organic solvent or a mixture of nonaqueous, aprotic organic solvents. Examples of lithium salts include $LiClO_4$, $LiAlCl_4$, $LiI$, $LiBr$, $LiSCN$, $LiBF_4$, $LiB(C_6H_5)_4$, $LiAsF_6$, $LiCF_3SO_3$, $LIN(CF_3SO_2)_2$, $Li_2CO_3$, $LiPF_6$, and combinations thereof. Examples of nonaqueous, aprotic organic solvents include cyclic carbonates (i.e., ethylene carbonate, propylene carbonate), acyclic carbonates (i.e., dimethyl carbonate, diethyl carbonate, ethyl methyl carbonate), aliphatic carboxylic esters (i.e., methyl formate, methyl acetate, methyl propionate), γ-lactones (i.e., γ-butyrolactone, γ-valerolactone), acyclic ethers (i.e., 1,2-dimethoxyethane, 1,2-diethoxyethane, ethoxymethoxyethane), and/or cyclic ethers (i.e., tetrahydrofuran, 2-methyltetrahydrofuran). The electrolyte 18 optionally may comprise one or more additives, for example, one or more of lithium difluoro(oxalato)borate (LiDFOB), lithium bis(oxalato)borate (LiBOB), fluoroethylene carbonate (FEC), and vinylene carbonate (VC).

Figure 3:
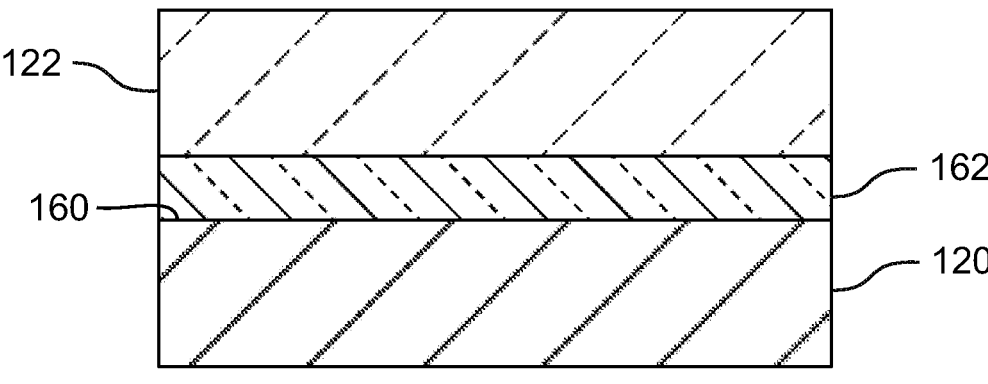
FIG. 3 is a schematic enlarged cross-sectional view of a portion of the current collector of FIG. 2 depicting a solid electrode material disposed on a wall surface thereof and an oxygen-containing adhesive layer disposed along an interface between the current collector and the solid electrode material.

Referring now to FIG. 3, a solid electrode material 122 (i.e., the positive electrode material 22 or the negative electrode material 26) may be formed on the wall surfaces 160 of the current collector 120 and an oxygen-containing adhesive layer 162 may be disposed along an interface between the current collector 120 and the solid electrode material 122. Like the positive electrode material 22 and the negative electrode material 26, the solid electrode material 122 may be formed on the wall surfaces 160 of the current collector 120 such that the electrode material 122 is disposed within the open pores 136 and along the first side 132 and the second side 134 of the current collector 120. In some aspects, the electrode material 122 may extend over the first side 132 and the second side 134 of the current collector 120 and through the interconnected network of open pores 136 in the current collector 120 such that the current collector 120 is embedded in the electrode material 122. In some aspects, the electrode material 122 may extend through the interconnected network of open pores 136 in the current collector 120 and may be flush with the first side 132 and/or the second side 134 of the current collector 120.

The oxygen-containing adhesive layer 162 may help form a strong adhesive bond between the wall surfaces 160 of the current collector 120 and the electrode material 122 and optionally may eliminate the need for an organic polymer binder in the electrode material 122. For example, the electroactive material particles and the electrically conductive agent in the electrode material 122 may be chemically bonded to the current collector 120 via hydrogen bonds within the oxygen-containing adhesive layer 162. The oxygen-containing adhesive layer 162 may comprise hydrogen bonds: O—H—O bonds, wherein the solid line denotes a polar covalent bond between the O and H atoms and the dashed line indicates the hydrogen bond. The hydrogen bonds within the oxygen-containing adhesive layer 162 may form between -hydroxyl groups, -carboxyl groups, and/or oxygen-containing species (e.g., metal oxides) covalently bonded to the wall surfaces 160 of the current collector 120 and -hydroxyl groups, -carboxyl groups, and/or oxygen-containing species covalently bonded to the electroactive material particles or the electrically conductive agent in the electrode material 122. In some aspects, the oxygen-containing adhesive layer 162 may comprise a metal oxide, e.g., copper oxide, aluminum oxide, zinc oxide, tin oxide, indium oxide, or a combination thereof.

The oxygen-containing adhesive layer 162 may have a thickness of less than or equal to about 15 nanometers or optionally less than or equal to about 5 nanometers. In some aspects, the oxygen-containing adhesive layer 162 may comprise a single atomic layer of hydrogen bonds between the current collector 120 and the electroactive material particles and/or the electrically conductive agent in the electrode material 122.

In some aspects, the electrically conductive agent and the electroactive material particles in the electrode material 122 may be chemically bonded to one another within the electrode material 122 via hydrogen bonds. The hydrogen bonds may form between the oxygen-containing hydrophilic functional groups on the surface of the electrically conductive agent and the electroactive material particles in the electrode material 122. The hydrogen bonds between the electroactive material particles and the electrically conductive agent in the electrode material 122 may be formed throughout the electrode material 122 and may extend around the three-dimensional porous structure of the current collector 120 and through the open pores 136 such that the electrode material 122 is retained in physical contact with the current collector 120.

Methods

Figure 4:
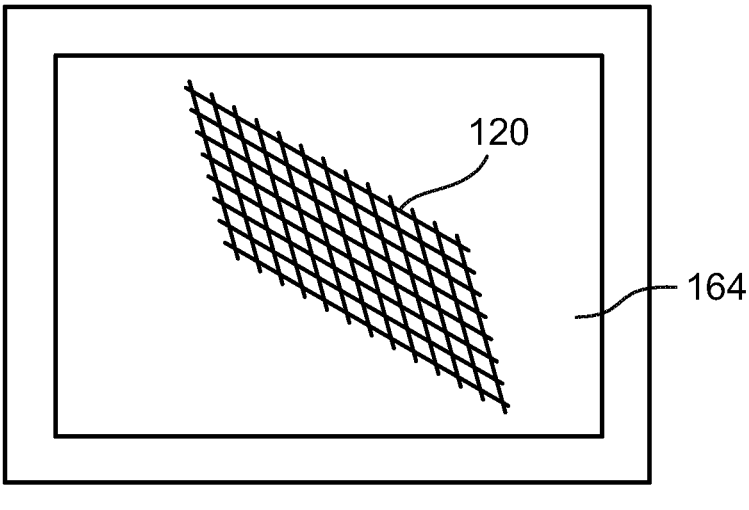
FIG. 4 is a schematic depiction of a step in method of manufacturing a composite electrode wherein an oxygen-containing reactive layer is formed on wall surfaces of the current collector of FIG. 2 by heating the current collector in an oxygen-containing environment.
Figure 5:
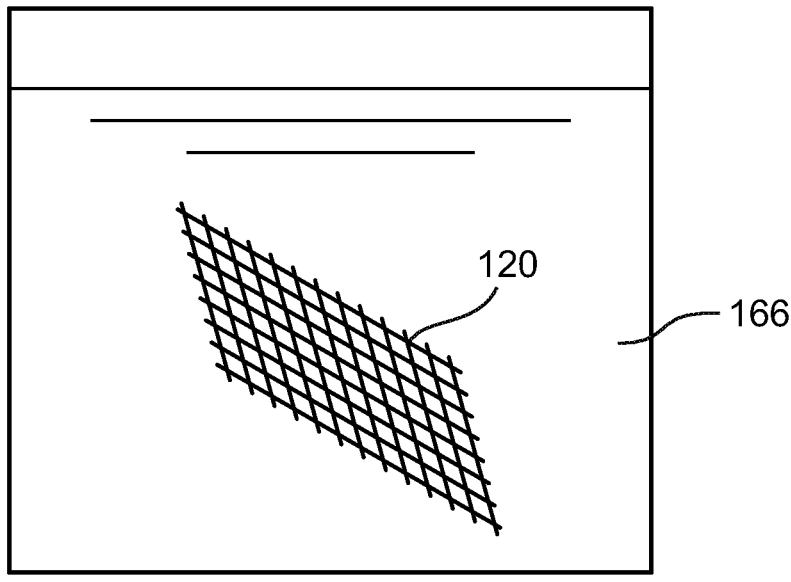
FIG. 5 is a schematic depiction of a step in method of manufacturing a composite electrode wherein an oxygen-containing reactive layer is formed on wall surfaces of the current collector of FIG. 2 by immersing the current collector in a basic solution.

A method of manufacturing a composite electrode (i.e., the positive electrode 12 or the negative electrode 14) may include one or more of the following steps. Referring now to FIGS. 4 and 5, in a first step, a current collector 120 may be provided and an oxygen-containing reactive layer (not shown) may be formed on the wall surfaces 160 thereof. The oxygen-containing reactive layer may extend substantially continuously over the wall surfaces 160 of the current collector 120 and may comprise metal oxides, metal hydroxides, and/or metal carboxylate species.

As shown in FIG. 4, in some aspects, the oxygen-containing reactive layer may be formed on the wall surfaces 160 of the current collector 120 by heating the current collector 120 in an oxygen-containing environment 164 (e.g., in air) at a temperature of greater than about 25° C. When the current collector 120 is heated in the oxygen-containing environment 164, the metal in the current collector 120 may react with the oxygen and/or water vapor in the oxygen-containing environment 164 to form metal oxides and/or metal hydroxides on the wall surfaces 160 of the current collector 120.

As shown in FIG. 5, in some aspects, the oxygen-containing reactive layer may be formed on the wall surfaces 160 of the current collector 120 by immersing the current collector 120 in a basic solution 166 having a pH of greater than 7, optionally greater than or equal to about 8. Examples of basic solutions 166 comprise aqueous hydroxide solutions, e.g., aqueous sodium hydroxide (NaOH) and/or potassium hydroxide (KOH) solutions. When the current collector 120 is immersed in the basic solution 166, the metal in the current collector 120 may react with hydroxyl ions in the basic solution 166 to form metal hydroxides on the wall surfaces 160 of the current collector 120.

In some aspects, the oxygen-containing reactive layer may be formed on the wall surfaces 160 of the current collector 120 using an electrochemical anodization technique (not shown). In such case, the reactive oxygen-containing layer may be formed on the wall surfaces 160 of the current collector 120 by immersing the current collector 120 in an aqueous electrolyte solution and then establishing an electrical potential difference between the current collector 120 and an inert cathode immersed in the aqueous electrolyte solution. It may be desirable to form the oxygen-containing reactive layer on the wall surfaces 160 of the current collector 120 using an electrochemical anodization technique, for example, in aspects where the current collector 120 is made of aluminum or an aluminum-based material.

Figure 6:
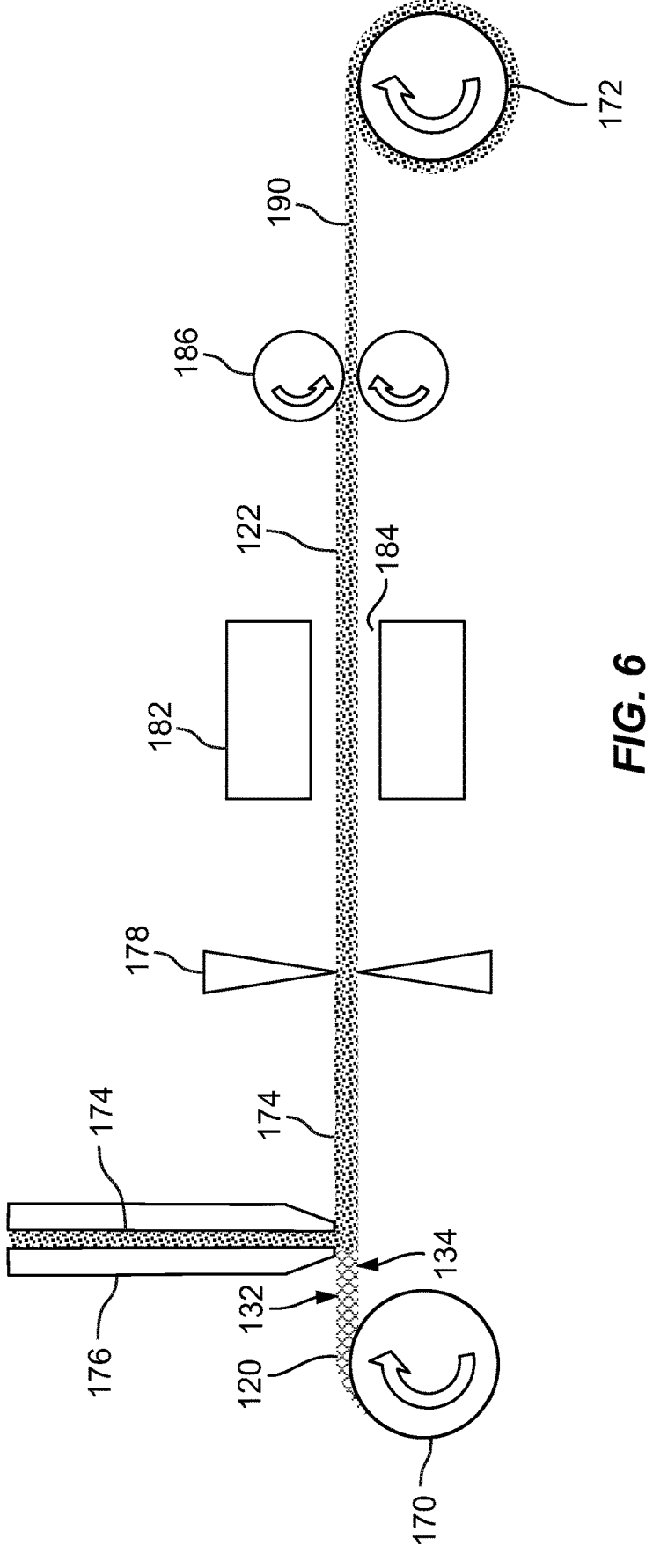
FIG. 6 is a schematic depiction of a step in method of manufacturing a composite electrode wherein a solid electrode material is formed on wall surfaces of the current collector of FIG. 2 using a continuous roll-to-roll process.

Referring now to FIG. 6, in a second step, a solid electrode material 122 (i.e., the positive electrode material 22 or the negative electrode material 26) may be formed on the wall surfaces 160 of the current collector 120 using a continuous roll-to-roll process. In such case, as shown in FIG. 6, the current collector 120 may be in the form of a continuous sheet or web extending in a substantially horizontal direction between an inlet roll 170 and an outlet roll 172 and the current collector 120 may be continually advanced through the manufacturing process by being unwound from the inlet roll 170 and rewound around the outlet roll 172 at the end of the manufacturing process.

The electrode material 122 may be formed on the wall surfaces 160 of the current collector 120 by preparing and depositing an electrode precursor mixture 174 on the first side 132 and/or the second side 134 of the current collector 120. The electrode precursor mixture 170 may comprise a mixture of electroactive material particles, an electrically conductive agent, and a solvent. In aspects where the presently disclosed method is used to manufacture the positive electrode 12, the electroactive material particles may comprise the same material(s) as the electroactive material particles in the positive electrode material 22. In aspects where the presently disclosed method is used to manufacture the negative electrode 14, the electroactive material particles may comprise the same material(s) as the electroactive material particles in the negative electrode material 26. The electroactive material particles may constitute, by weight, greater than or equal to about 60% to less than or equal to about 85% of the electrode precursor mixture 174. The electrically conductive agent may comprise the same material(s) as the electrically conductive agent in the positive electrode material 22 or the negative electrode material 26. The electrically conductive agent may constitute, by weight, greater than or equal to about 0.1% to less than or equal to about 10% of the electrode precursor mixture 174. The solvent may comprise one or more polar solvents. Examples of polar solvents comprise water, methanol, acetone, and combinations thereof. In some embodiments, the electrode precursor mixture 174 may be substantially free of N-methylpyrrolidone (also known as NMP or 1-methyl-2-pyrrolidone). The solvent may constitute, by weight, greater than or equal to about 10% to less than about 40% of the electrode precursor mixture 174.

The electrode precursor mixture 174 may be substantially free of a binder. For example, the electrode precursor mixture 174 may be substantially free of organic polymer binders. Examples of organic polymers that may excluded from the electrode precursor mixture 174 include polyvinylidene fluoride (PVDF), ethylene propylene diene monomer (EPDM) rubber, styrene butadiene rubber (SBR), carboxymethyl cellulose (CMC), and/or polyacrylic acid (PAA).

The electrode precursor mixture 174 may be deposited on the first side 132 and/or the second side 134 of the current collector 120 using a slot die coater 176 as part of a slot die coating process, an extruder (not shown) as part of an extrusion coating process, or via another suitable deposition process. The electrode precursor mixture 174 may be deposited on the first side 132 and/or the second side 134 of the current collector 120 such that the electrode precursor mixture 174 fills in the open pores 136 and extends along the first side 132 and the second side 134 of the current collector 120. In aspects, the electrode precursor mixture 174 may be deposited on the first side 132 and/or the second side 134 of the current collector 120 such that the electrode precursor mixture 174 extends over the first side 132 and/or the second side 134 of the current collector 120 such that the current collector 120 is partially or entirely encapsulated in the electrode precursor mixture 174.

In some embodiments, after the electrode precursor mixture 174 is deposited on the current collector 120, a spreader 178 optionally may be used to ensure that the electrode precursor mixture 174 fills in the open pores 136 of the current collector 120, to remove excess amounts of the electrode precursor mixture 174 from the current collector 120, and ensure that the electrode precursor mixture 174 exhibits a uniform thickness. The spreader 178 depicted in FIG. 6 comprises a set of plates spaced apart from one another by a gap and disposed on opposite sides of the current collector 120. However, in other embodiments, the spreader 178 may comprise a set of rollers (not shown) spaced apart from one another by a gap and disposed on opposite sides of the current collector 120. Excess amounts of the electrode precursor mixture 174 may be removed from the current collector 120 by passing the electrode precursor mixture 174 and the current collector 120 between the plates or the rollers of the spreader 178.

After the electrode precursor mixture 174 is deposited on the current collector 120, the electrode precursor mixture 174 may be dried to remove the solvent therefrom and form the solid electrode material 122 within the open pores 136 and along the first side 132 and the second side 134 of the current collector 120. The electrode precursor mixture 174 may be dried by passing the electrode precursor mixture 174 and the current collector 120 through an oven 182 or other heating device defining a heated chamber or passageway 184. During the drying process, the electrode precursor mixture 174 may be heated in the passageway 184 at a temperature of greater than about 25° C. The electrode precursor mixture 174 and the current collector 120 may be advanced through the drying process by movement of the current collector 120 between the inlet roll 170 and the outlet roll 172.

After the electrode precursor mixture 174 is deposited on the current collector 120 and optionally during and/or after the electrode precursor mixture 174 is dried, hydrogen bonds may form between the oxygen-containing reactive layer on the wall surfaces 160 of the current collector 120 and the electroactive material particles and/or the electrically conductive agent in the electrode precursor mixture 174 and/or the solid electrode material 122 to form the oxygen-containing adhesive layer 162. For example, hydrogen bonds may form between the -hydroxyl groups, -carboxyl groups, and/or oxygen-containing species in the oxygen-containing reactive layer on the wall surfaces 160 of the current collector 120 and the -hydroxyl groups, -carboxyl groups, and/or oxygen-containing species in the electroactive material particles and/or the electrically conductive agent in the electrode precursor mixture 174 and/or the solid electrode material 122. The hydrogen bonds within the oxygen-containing adhesive layer 162 may help form a strong adhesive bond between the wall surfaces 160 of the current collector 120 and the electrode material 122.

In some aspects, the solid electrode material 122 may be calendared by passing the solid electrode material 122 and the current collector 120 between a set of rollers 186 to consolidate the electroactive material particles and the electrically conductive agent in the solid electrode material 122 and form a composite electrode 190 including the consolidated solid electrode material 122 and the current collector 120. The rollers 186 may be spaced-apart from one another by a gap and disposed on opposite sides of the current collector 120. The solid electrode material 122 and the current collector 120 may be advanced through the calendaring process by movement of the current collector 120 between the inlet roll 170 and the outlet roll 172.

After formation of the composite electrode 190, the composite electrode 190 including the consolidated solid electrode material 122 and the current collector 120 may be wound around the outlet roll 172.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

The terminology used herein is for the purpose of describing example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended terms "comprises," "comprising," "including," and "having," are to be understood as non-restrictive terms used to describe and claim various embodiments set forth herein, in certain aspects, the terms may alternatively be understood to instead be a more limiting and restrictive term, such as "consisting of" or "consisting essentially of." Thus, for any given embodiment reciting compositions, materials, components, elements, ingredients, features, integers, operations, and/or process steps, the present disclosure also specifically includes embodiments consisting of, or consisting essentially of, such recited compositions, materials, components, elements, ingredients, features, integers, operations, and/or process steps. In the case of "consisting of," the alternative embodiment excludes any additional compositions, materials, components, elements, ingredients, features, integers, operations, and/or process steps, while in the case of "consisting essentially of," any additional compositions, materials, components, elements, ingredients, features, integers, operations, and/or process steps that materially affect the basic and novel characteristics are excluded from such an embodiment, but any compositions, materials, components, elements, ingredients, features, integers, operations, and/or process steps that do not materially affect the basic and novel characteristics can be included in the embodiment.

Any method steps, processes, and operations described herein are not to be construed as necessarily requiring their performance in the order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer, or section. Terms such as "first," "second," and other numerical terms when used herein do not imply a sequence or order unless clearly indicated by the context. Thus, a first step, element, component, region, layer, or section discussed below could be termed a second step, element, component, region, layer, or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s), as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges and encompass minor deviations from the given values and embodiments, having about the value mentioned as well as those having exactly the value mentioned. Other than the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%. In addition, disclosure of ranges includes disclosure of all values and further divided ranges within the entire range, including endpoints and sub-ranges given for the ranges.

As used herein, the terms "composition" and "material" are used interchangeably to refer broadly to a substance containing at least the preferred chemical constituents, elements, or compounds, but which may also comprise additional elements, compounds, or substances, including trace amounts of impurities, unless otherwise indicated. An "X-based" composition or material broadly refers to compositions or materials in which "X" is the single largest constituent of the composition or material on a weight percentage (%) basis. This may include compositions or materials having, by weight, greater than 50% X, as well as those having, by weight, less than 50% X, so long as X is the single largest constituent of the composition or material based upon its overall weight. When a composition or material is referred to as being "substantially free" of a substance, the composition or material may comprise, by weight, less than 5%, optionally less than 3%, optionally less than 1%, or optionally less than 0.1% of the substance.

As used herein, the term "metal" may refer to a pure elemental metal or to an alloy of an elemental metal and one or more other metal or nonmetal elements (referred to as "alloying" elements). The alloying elements may be selected to impart certain desirable properties to the alloy that are not exhibited by the base metal element.

What is claimed is:

1. A method of manufacturing a composite electrode for an electrochemical cell that cycles lithium ions, the method comprising the following steps:

(a) forming an oxygen-containing reactive layer on wall surfaces of a metal current collector having a first side, an opposite second side, and a three-dimensional porous structure defining an interconnected network of open pores extending between the first side and the second side thereof;

(b) depositing an electrode precursor mixture on the wall surfaces of the metal current collector such that the electrode precursor mixture is disposed within the open pores and along the first side and the second side of the metal current collector, the electrode precursor mixture comprising electroactive material particles, an electrically conductive agent, and a solvent, the electrode precursor mixture comprising, by weight, less than 1% of an organic polymer binder, the electrically conductive agent comprising a carbon-based material having oxygen-containing hydrophilic functional groups disposed on a surface thereof; and (c) drying the electrode precursor mixture to remove the solvent therefrom and form a solid electrode material having a continuous structure and being disposed within the open pores and along the first side and the second side of the metal current collector, the electroactive material particles and the electrically conductive agent being chemically bonded to one another within the solid electrode material via hydrogen bonds that extend around the three-dimensional porous structure of the metal current collector and through the interconnected network of open pores such that the electrode material is retained in physical contact with the metal current collector, wherein the electroactive material particles and the electrically conductive agent interact with the oxygen-containing reactive layer on the wall surfaces of the metal current collector to form an oxygen-containing adhesive layer along an interface between the wall surfaces of the metal current collector and the solid electrode material, and wherein the electroactive material particles and the electrically conductive agent are chemically bonded to the wall surfaces of the metal current collector via hydrogen bonds within the oxygen-containing adhesive layer.

2. The method of claim 1, wherein the oxygen-containing reactive layer comprises a plurality of -hydroxyl groups, -carboxyl groups, and/or metal oxides covalently bonded to the wall surfaces of the metal current collector, and wherein the oxygen-containing reactive layer is formed on the wall surfaces of the metal current collector:

by heating the metal current collector in an oxygen-containing environment;

by immersing the metal current collector in an aqueous hydroxide solution; or using an electrochemical anodization technique.

3. The method of claim 1, wherein the electrode precursor mixture is deposited on the wall surfaces of the metal current collector over the first side and the second side of the metal current collector such that the metal current collector is encapsulated in the electrode precursor mixture.

4. The method of claim 1, wherein the electrode precursor mixture is substantially free of polyvinylidene fluoride, ethylene propylene diene monomer rubber, styrene butadiene rubber, carboxymethyl cellulose, and polyacrylic acid, and wherein the electrode precursor mixture is substantially free of N-methylpyrrolidone.

5. The method of claim 1, further comprising:

prior to step (c), forcing the electrode precursor mixture into the open pores of the metal current collector such that the electrode precursor mixture fills the open pores and removing an excess amount of the electrode precursor mixture from the metal current collector by passing the electrode precursor mixture and the metal current collector between a set of plates disposed on opposite sides of the metal current collector and spaced-apart from one another by a gap; and after step (c), consolidating the electroactive material particles and the electrically conductive agent within the solid electrode material by passing the solid electrode material and the metal current collector between set of rollers disposed on opposite sides of the metal current collector and spaced-apart from one another by a gap.

6. The method of claim 1, wherein:

the electroactive material particles comprise a transition metal oxide that can undergo the reversible insertion or intercalation of lithium ions, and wherein the metal current collector comprises aluminum; or the electroactive material particles comprise silicon, silicon oxide, tin, tin oxide, aluminum, bismuth, antimony, indium, zinc, germanium, germanium oxide, titanium oxide, or a combination thereof, and wherein the metal current collector comprises copper.

7. A composite electrode for an electrochemical cell that cycles lithium ions, the electrode comprising:

a metal current collector having a first side, an opposite second side, and a three-dimensional porous structure that defines an interconnected network of open pores extending between the first side and the second side thereof, the interconnected network of open pores being defined by walls having wall surfaces that extend between the first side and the second side of the metal current collector;

an electrode material having a continuous structure and being disposed within the open pores and along the first side and the second side of the metal current collector, the electrode material comprising electroactive material particles and an electrically conductive agent, the electrode material comprising, by weight, less than 1% of an organic polymer binder, the electrically conductive agent comprising a carbon-based material having oxygen-containing hydrophilic functional groups disposed on a surface thereof, the electroactive material particles and the electrically conductive agent being chemically bonded to one another within the electrode material via hydrogen bonds that extend around the three-dimensional porous structure of the metal current collector and through the interconnected network of open pores such that the electrode material is retained in physical contact with the metal current collector; and an oxygen-containing adhesive layer disposed along an interface between the metal current collector and the electrode material, wherein the electrode material is chemically bonded to the wall surfaces of the metal current collector via hydrogen bonds within the oxygen-containing adhesive layer.

8. The composite electrode of claim 7, wherein the electroactive material particles and the electrically conductive agent are chemically bonded to the wall surfaces of the metal current collector via hydrogen bonds within the oxygen-containing adhesive layer.

9. The composite electrode of claim 8, wherein the electrode material has a continuous structure and extends over the first side and the second side of the metal current collector such that the metal current collector is encapsulated in the electrode material, and wherein the electrode material entirely fills the open pores of the metal current collector.

10. The composite electrode of claim 9, wherein the metal current collector is macroporous, the open pores have pore diameters of greater than 50 nanometers, and the metal current collector has a porosity of greater than or equal to 0.5 and less than or equal to 0.99.

11. The composite electrode of claim 10, wherein the metal current collector has a thickness of greater than or equal to 1 micrometer and less than or equal to 60 micrometers.

12. The composite electrode of claim 11, wherein, during formation of the composite electrode, the electroactive material particles and the electrically conductive agent interact with -hydroxyl groups, -carboxyl groups, and/or metal oxides covalently bonded to the wall surfaces of the metal current collector to form the oxygen-containing adhesive layer.

13. The composite electrode of claim 12, wherein the composite electrode comprises, by weight, less than 0.1% polyvinylidene fluoride, ethylene propylene diene monomer rubber, styrene butadiene rubber, carboxymethyl cellulose, polyacrylic acid, and N-methylpyrrolidone.

14. The composite electrode of claim 13, wherein the oxygen-containing adhesive layer has a thickness of less than or equal to 15 nanometers.

15. The composite electrode of claim 13, wherein the oxygen-containing adhesive layer consists of a single atomic layer of hydrogen bonds between the metal current collector and the electroactive material particles and/or the electrically conductive agent in the electrode material.

16. The composite electrode of claim 14, wherein the electroactive material particles comprise a transition metal oxide that can undergo the reversible insertion or intercalation of lithium ions, the metal current collector comprises aluminum, and the oxygen-containing adhesive layer comprises aluminum oxide.

17. The composite electrode of claim 14, wherein the electroactive material particles comprise silicon, silicon oxide, tin, tin oxide, aluminum, bismuth, antimony, indium, zinc, germanium, germanium oxide, titanium oxide, or a combination thereof, the metal current collector comprises copper, and the oxygen-containing adhesive layer comprises copper oxide.

* * * * *